US012567987B2

(12) United States Patent　　(10) Patent No.:　US 12,567,987 B2
Kwak et al.　　(45) Date of Patent:　　Mar. 3, 2026

(54) ELECTRONIC DEVICE CORRESPONDING TO NODE INCLUDED IN BLOCKCHAIN NETWORK AND OPERATION METHOD THEREFOR

(71) Applicant: SAMSUNG ELECTRONICS CO., LTD., Suwon-si (KR)

(72) Inventors: Nosan Kwak, Suwon-si (KR); Sohee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 18/387,675

(22) Filed: Nov. 7, 2023

(65) Prior Publication Data

US 2024/0078548 A1　　Mar. 7, 2024

Related U.S. Application Data

(63) Continuation of application No. PCT/KR2022/006272, filed on May 2, 2022.

(30) Foreign Application Priority Data

May 7, 2021　(KR) ........................ 10-2021-0059464

(51) Int. Cl.
　　H04L 9/00　　(2022.01)
　　G06N 20/20　　(2019.01)
(52) U.S. Cl.
　　CPC .............. H04L 9/50 (2022.05); G06N 20/20 (2019.01)

(58) Field of Classification Search
　　CPC ....... H04L 67/104; H04L 9/3239; H04L 9/50; G06N 20/20; G06N 20/00; G06Q 20/401
　　See application file for complete search history.

(56) References Cited

U.S. PATENT DOCUMENTS

| | | | |
|---|---|---|---|
| 11,569,981 B1 * | 1/2023 | Mishra | ................... G06F 21/64 |
| 11,868,911 B1 * | 1/2024 | Almasan | ................. G06N 5/04 |
| 2019/0012595 A1 | 1/2019 | Beser et al. | |
| 2019/0236598 A1 | 8/2019 | Padmanabhan | |
| 2020/0005213 A1 | 1/2020 | Clemens | |

(Continued)

FOREIGN PATENT DOCUMENTS

| | | |
|---|---|---|
| CN | 111813573 A | 10/2020 |
| CN | 112711639 A | 4/2021 |

(Continued)

OTHER PUBLICATIONS

Communication dated Sep. 13, 2024, issued by the European Patent Office in counterpart European Application No. 22799082.7.

(Continued)

*Primary Examiner* — William P Bartlett
(74) *Attorney, Agent, or Firm* — Sughrue Mion, PLLC

(57) ABSTRACT

An electronic device corresponding to a node of a blockchain network includes a communication module and a processor configured to access, through the communication module, the blockchain network in which at least one artificial intelligence (AI) model is registered, identify at least one program among a plurality of programs configured to manage the at least one AI model registered in the blockchain network and manage, using the at least one program, the at least one AI model registered in the blockchain network.

16 Claims, 9 Drawing Sheets

(56)                References Cited

U.S. PATENT DOCUMENTS

| | | | |
|---|---|---|---|
| 2020/0169408 A1 | 5/2020 | Herrin et al. | |
| 2021/0034986 A1 | 2/2021 | House et al. | |
| 2021/0035018 A1* | 2/2021 | Kim | H04L 9/50 |
| 2021/0064763 A1 | 3/2021 | Sanghvi et al. | |
| 2021/0110310 A1* | 4/2021 | Guim Bernat | G06F 16/27 |
| 2021/0326746 A1* | 10/2021 | Dayama | G06N 20/00 |
| 2022/0044162 A1* | 2/2022 | Zhang | G06F 21/64 |
| 2022/0066905 A1 | 3/2022 | Lee et al. | |
| 2022/0345323 A1* | 10/2022 | Aylward | G06F 21/64 |
| 2023/0232213 A1* | 7/2023 | Hong | H04W 8/24 |
| | | | 370/329 |

FOREIGN PATENT DOCUMENTS

| | | | |
|---|---|---|---|
| KR | 10-1701131 B1 | 2/2017 | |
| KR | 10-1976626 B1 | 5/2019 | |
| KR | 10-2061448 B1 | 12/2019 | |
| KR | 10-2106373 B1 | 5/2020 | |
| KR | 10-2020-0091556 A | 7/2020 | |
| KR | 10-2020-0092447 A | 8/2020 | |

OTHER PUBLICATIONS

Keon Myung Lee et al., "Data privacy-preserving distributed knowledge discovery based on the blockchain," Information Technology and Management, vol. 21, pp. 191-204, 2020, XP037339646.
Reginald Bryant et al., "Analysis Bias in Sensitive Personal Information Used to Train Financial Models," arXiv:1911.03623v1 [cs. CR], Nov. 9, 2019, total 5 pages, XP081529363.
Communication dated Aug. 5, 2022, issued by the International Searching Authority in counterpart International Application No. PCT/KR2022/006272 (PCT/ISA/210).
Communication dated Aug. 5, 2022, issued by the International Searching Authority in counterpart International Application No. PCT/KR2022/006272 (PCT/ISA/237).

* cited by examiner

ELECTRONIC DEVICE CORRESPONDING TO NODE INCLUDED IN BLOCKCHAIN NETWORK AND OPERATION METHOD THEREFOR

CROSS-REFERENCE TO RELATED APPLICATIONS

This application is a bypass continuation of International Application No. PCT/KR2022/006272, filed on May 2, 2022, in the Korean Intellectual Property Receiving Office, which is based on and claims priority to Korean Patent Application No. 10-2021-0059464, filed on May 7, 2021, in the Korean Intellectual Property Office, the disclosures of which are incorporated herein by reference in their entireties.

BACKGROUND

1. Field

The disclosure relates to an electronic device corresponding to a node included in a blockchain network and a method of operating the same.

2. Description of Related Art

After the release of bitcoin based on blockchain, blockchain has been applied to various fields including an electronic money system (cryptocurrency or virtual currency) such as bitcoin, as well as a platform provision service based on a smart contract, a cloud storage service, and a blockchain computing service.

In the blockchain platform, members (nodes) participating in the system distribute and store data in their own blocks, and thus it is not possible to forge or tamper the data (reliability), the members may hold distributed information (transparency), and an administrator of a separate central server is not needed.

Due to the development of technology, smartization of manufacturing plants is accelerating, and automation of manufacturing processes is being discussed. The technology that makes it possible is artificial intelligence (AI) technology. The AI technology is used in various ranges such as autonomous vehicles, robots, factory automation, and Internet of things (IoT) devices.

The recent AI technology involves developing of an AI model using a neural network model. In order to use the AI model, a system for managing various AI models is needed. For example, an AI hub that manages AI models together may be used.

A system which separately manages AI models used in manufacturing sites has never existed. AI models are individually managed or are stored in a cloud server and provided to manufacturing sites. There may be restrictions to provide AI models through the cloud service in the manufacturing sites. For example, security data may be leaked to an external cloud server and thus manufacturing confidentiality leakage may be generated, and processes may not be conducted in real time due to a poor network environment.

The AI models may be stored in a central server and managed without the use of the cloud server. However, when the central server is hacked, services for providing AI models may be all stopped. Further, when the central server is hacked, AI models may be used for incorrect manufacturing equipment by external remote control. In addition, even though the central server is not hacked, the central server may be down or have an error due to overload of the central server.

SUMMARY

Provided are an electronic device, which may register at least one AI model and a program performing a function of managing the at least one AI model in a blockchain network, and may perform the function of managing the at least one AI model registered in the blockchain network using the program, and a method of operating the same.

Additional aspects will be set forth in part in the description which follows and, in part, will be apparent from the description, or may be learned by practice of the presented embodiments.

According to an aspect of the disclosure, an electronic device corresponding to a node of a blockchain network may include a communication module and a processor configured to access, through the communication module, the blockchain network in which at least one artificial intelligence (AI) model is registered, identify at least one program among a plurality of programs configured to manage the at least one AI model registered in the blockchain network and manage, using the at least one program, the at least one AI model registered in the blockchain network.

The processor may be further configured to execute a first program among the plurality of programs, based on data related to the first program, identify, using the first program, a capability of a new AI model requested to be registered in the blockchain network, and determine, using the first program, whether to register the new AI model in the blockchain network based on a result of the identification of the capability of the new AI model.

The processor may be further configured to receive capability information about the new AI model while receiving a request for registering the new AI model in the blockchain network, identify whether the capability of the new AI model matches the capability information, and generate first capability evaluation information about the new AI model based on a result of the identification as to whether the capability of the new AI model matches the capability information.

The processor may be further configured to acquire second capability evaluation information about the new AI model generated by each of a plurality of nodes accessing the blockchain network and determine whether to register the new AI model in the blockchain network, based on the first capability evaluation information and the second capability evaluation information.

The processor may be further configured to execute a second program among the plurality of programs based on data related to the second program, identify, using the second program, a first capability value of a first AI model that is being used among the at least one AI model and identify whether there is an error in a capability of the first AI model, based on the first capability value.

The processor may be further configured to acquire a second capability value of the first AI model generated by each of a plurality of nodes accessing the blockchain network and identify whether there is the error in the capability of the first AI model, based on the first capability value and the second capability value.

The processor may be further configured to execute a third program among the plurality of programs, based on data related to the third program, receive a capability report request of a second AI model among the at least one AI model from an external electronic device, acquire, using the third program, capability data of the second AI model indicating a result value obtained by applying the second AI model to each of a plurality of fields in response to the capability report request and provide a capability report generated based on the capability data to the external electronic device.

The processor may be further configured to acquire the result value from blocks included in the blockchain network.

The processor may be further configured to execute a fourth program among the plurality of programs, based on data related to the fourth program, receive a request for training a third AI model among the at least one AI model from an external electronic device, and allocate, using the fourth program and based on the request for training the third AI model, system resources for training the third AI model to the external electronic device.

The information about the at least one AI model may be stored in a plurality of blocks included in the blockchain network.

According to an aspect of the disclosure, a method of operating an electronic device corresponding to a node of a blockchain network may include accessing the blockchain network in which at least one AI model is registered, identifying at least one program among a plurality of programs configured to manage the at least one AI model registered in the blockchain network and managing, using the at least one program, the at least one AI model registered in the blockchain network.

The managing the at least one AI model may include executing a first program among the plurality of programs, based on data related to the first program, identifying, using the first program, a capability of a new AI model requested to be registered in the blockchain network, and determining, using the first program, whether to register the new AI model in the blockchain network based on a result of the identification of the capability of the new AI model.

The determining whether to register the new AI model in the blockchain network may include receiving capability information about the new AI model while receiving a request for registering the new AI model in the blockchain network, identifying whether the capability of the new AI model matches the capability information and generating first capability evaluation information about the new AI model, based on a result of the identification as to whether the capability of the new AI model matches the capability information.

The determining whether to register the new AI model in the blockchain network further may include acquiring second capability evaluation information about the new AI model generated by each of a plurality of nodes accessing the blockchain network and determining whether to register the new AI model in the blockchain network, based on the first capability evaluation information and the second capability evaluation information.

According to an aspect of the disclosure, a non-transitory computer-readable recording medium may store instructions that, when executed by at least one processor, cause the at least one processor to access a blockchain network in which at least one AI model is registered, identify at least one program among a plurality of programs configured to manage the at least one AI model registered in the blockchain network and manage, using the at least one program, the at least one AI model registered in the blockchain network.

BRIEF DESCRIPTION OF DRAWINGS

The above and other aspects, features, and advantages of certain embodiments of the present disclosure will be more

Figure 1:
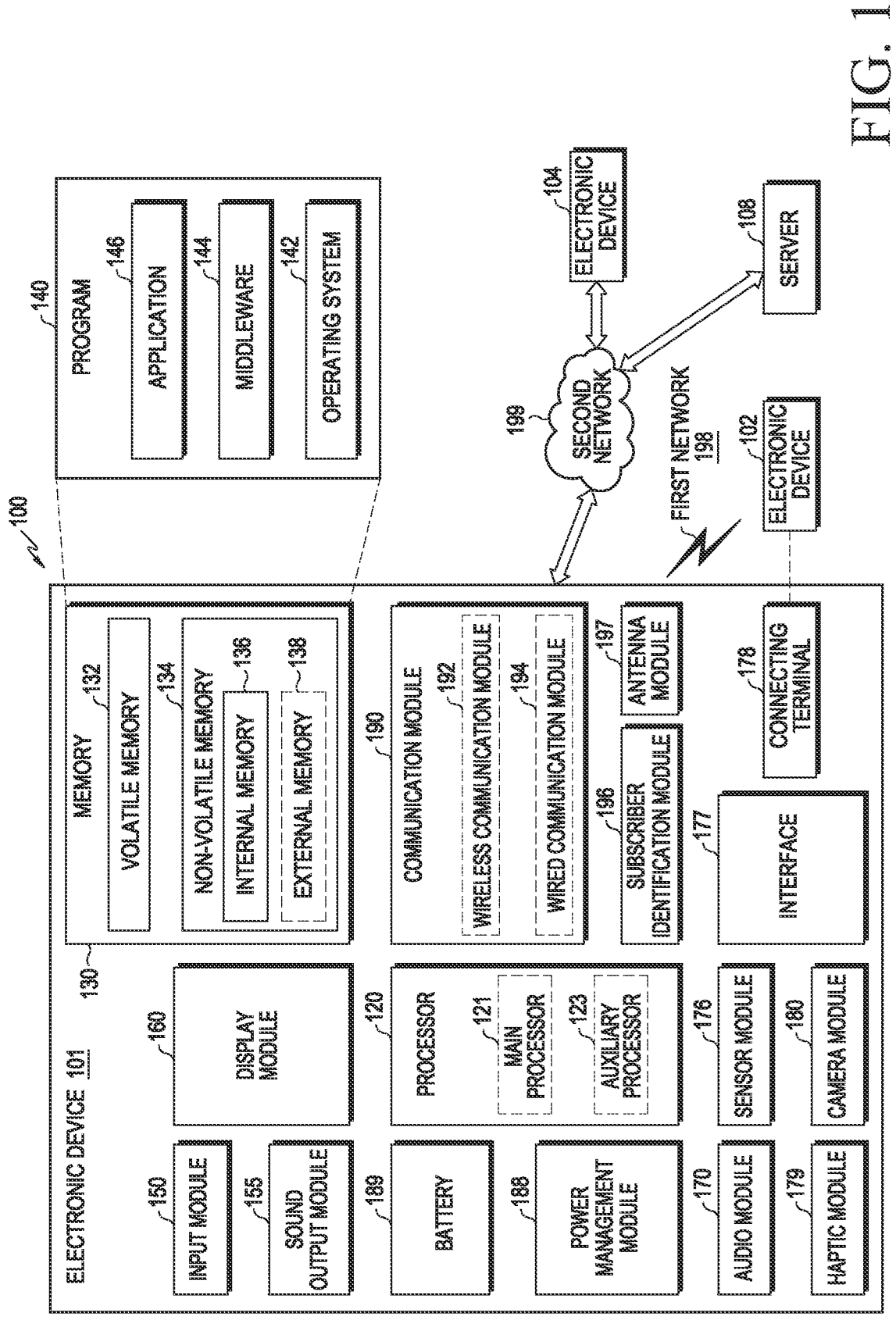
Figure 2A:
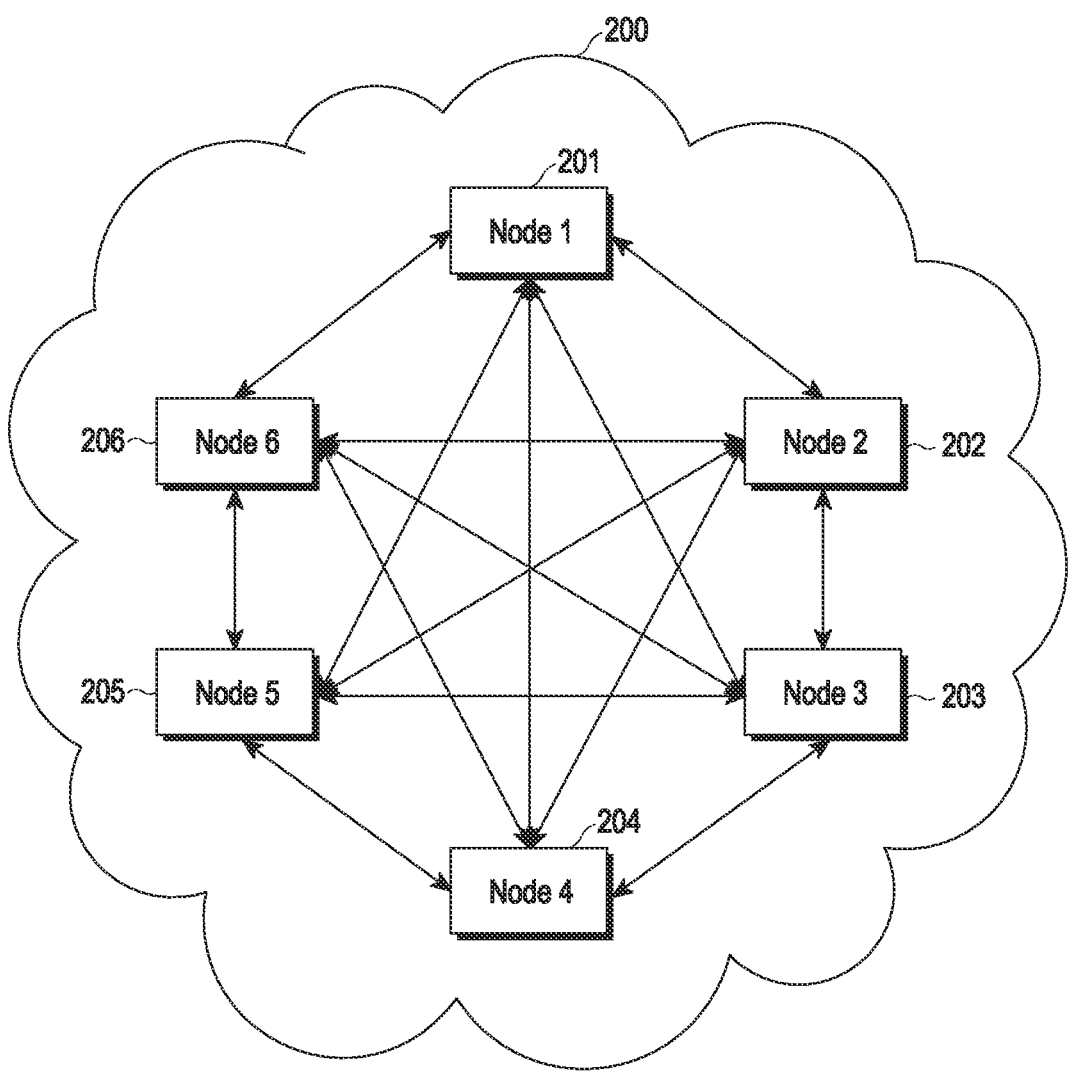
Figure 2B:
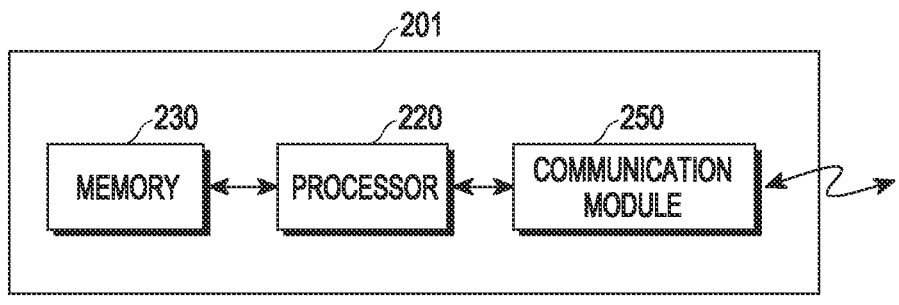
Figure 3:
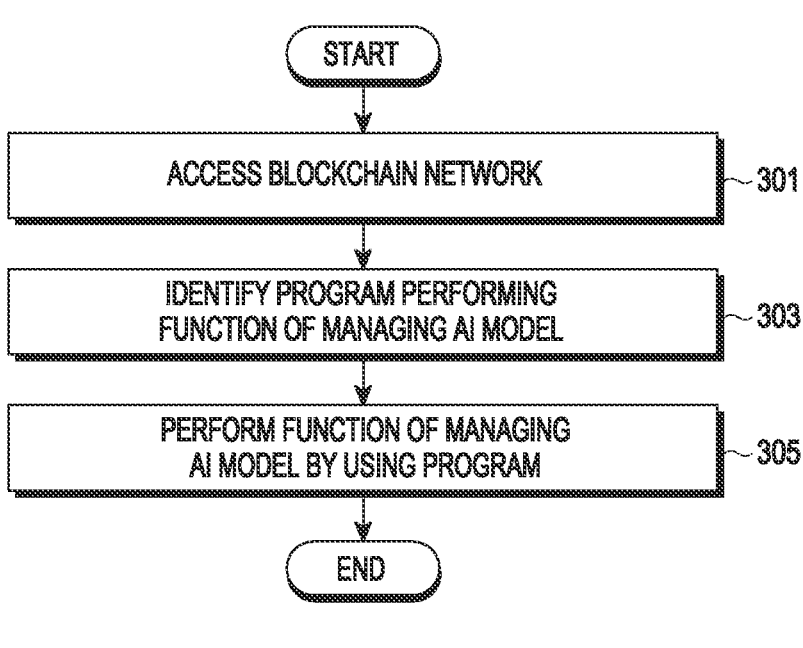
Figure 4:
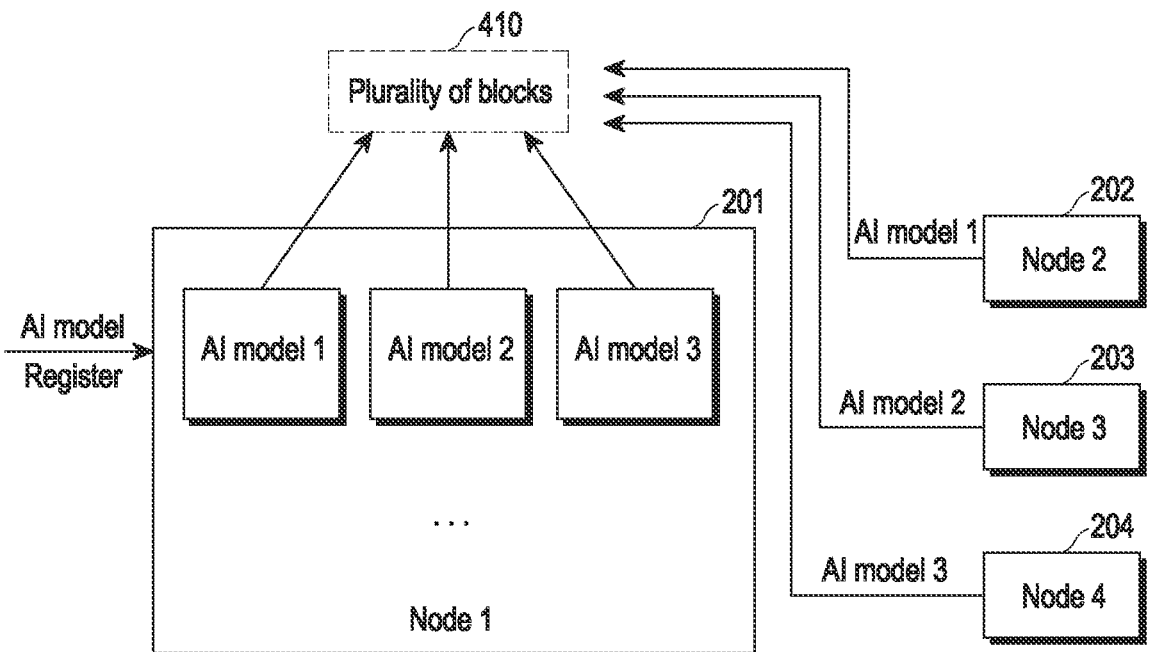
Figure 5A:
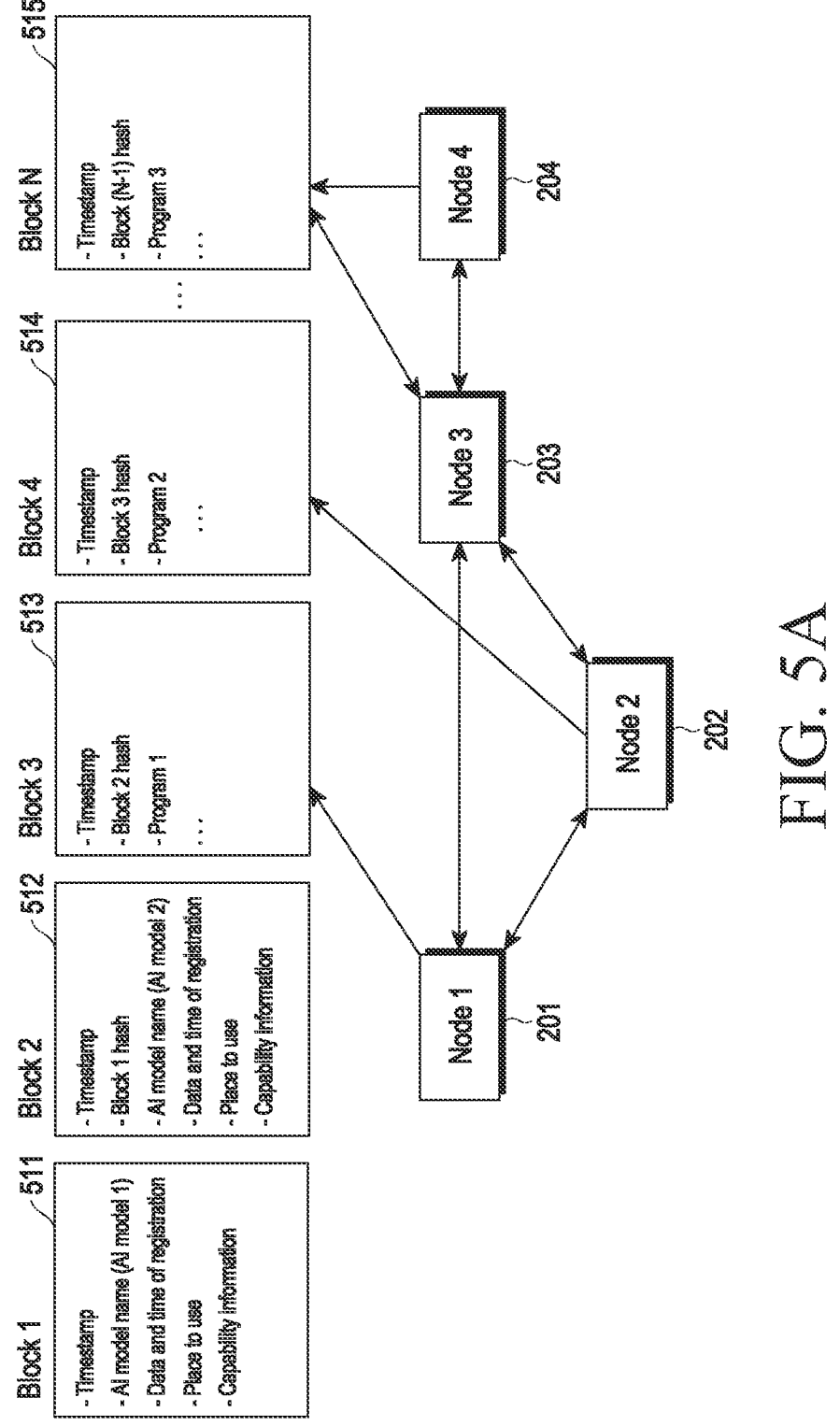
Figure 5B:
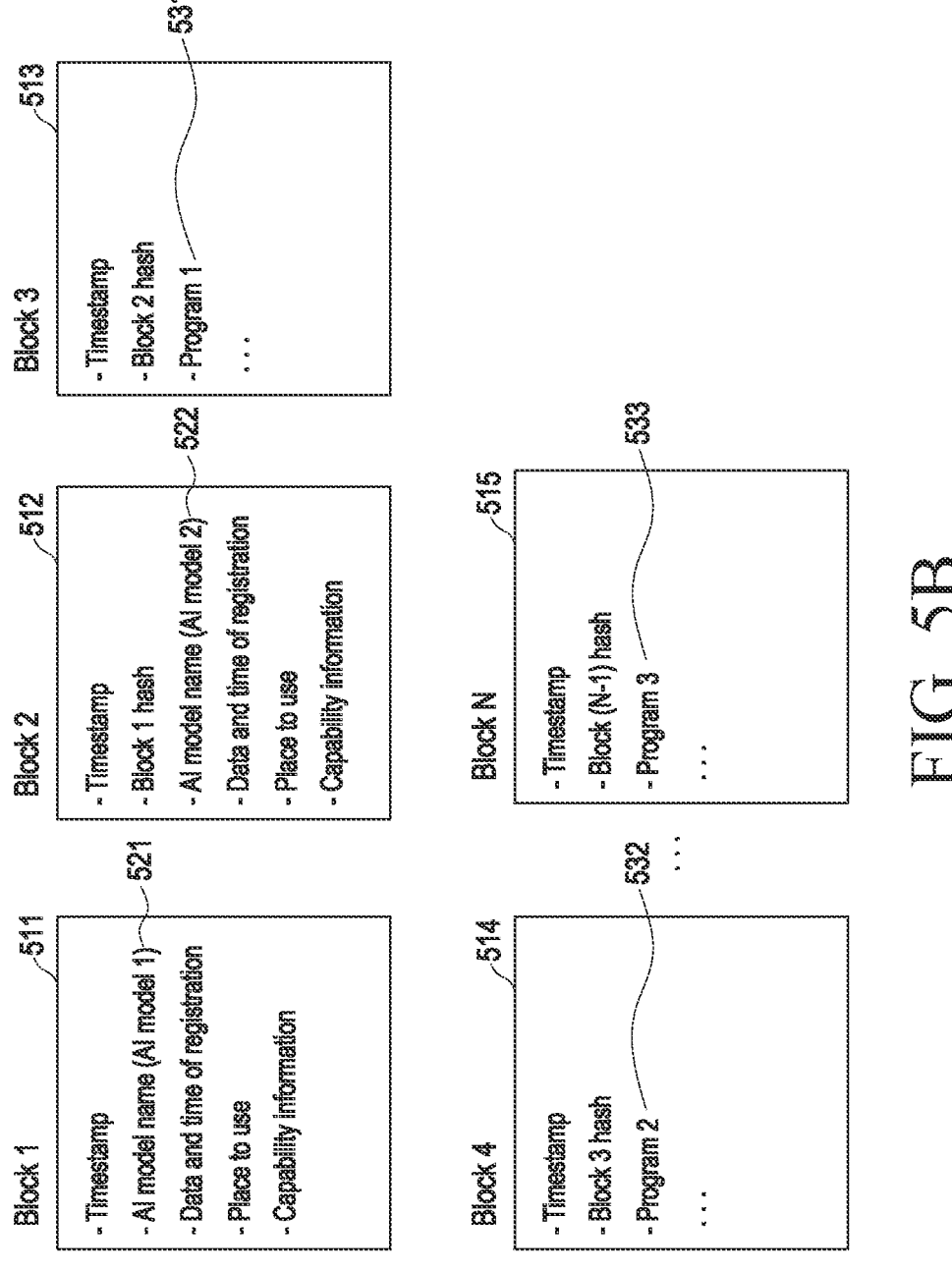
Figure 6:
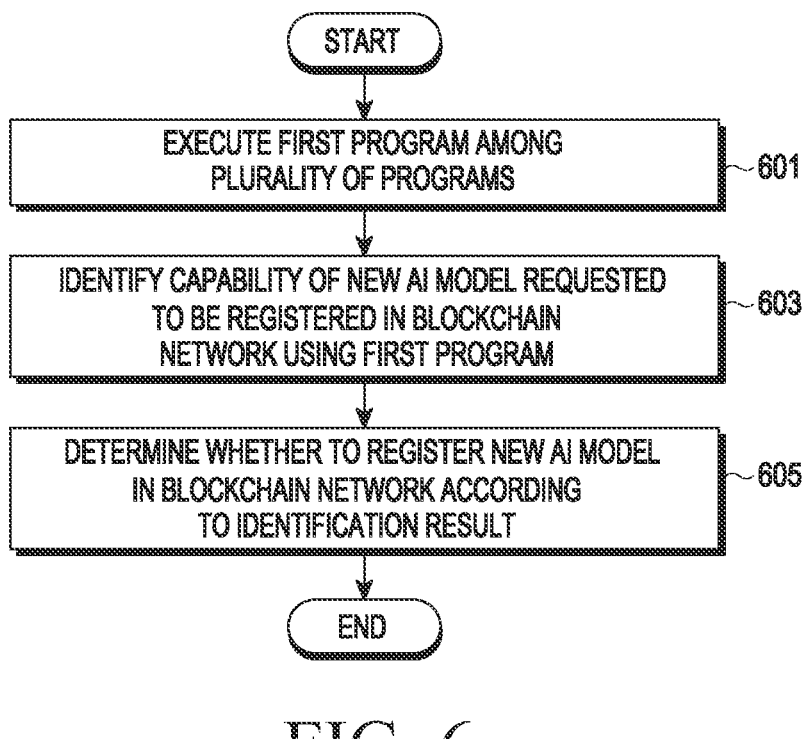
Figure 7:
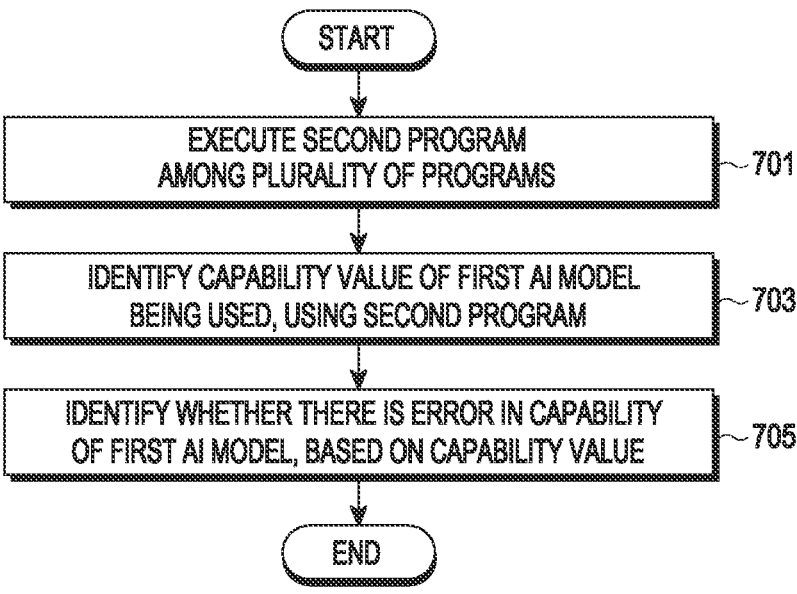
Figures 8, 9:
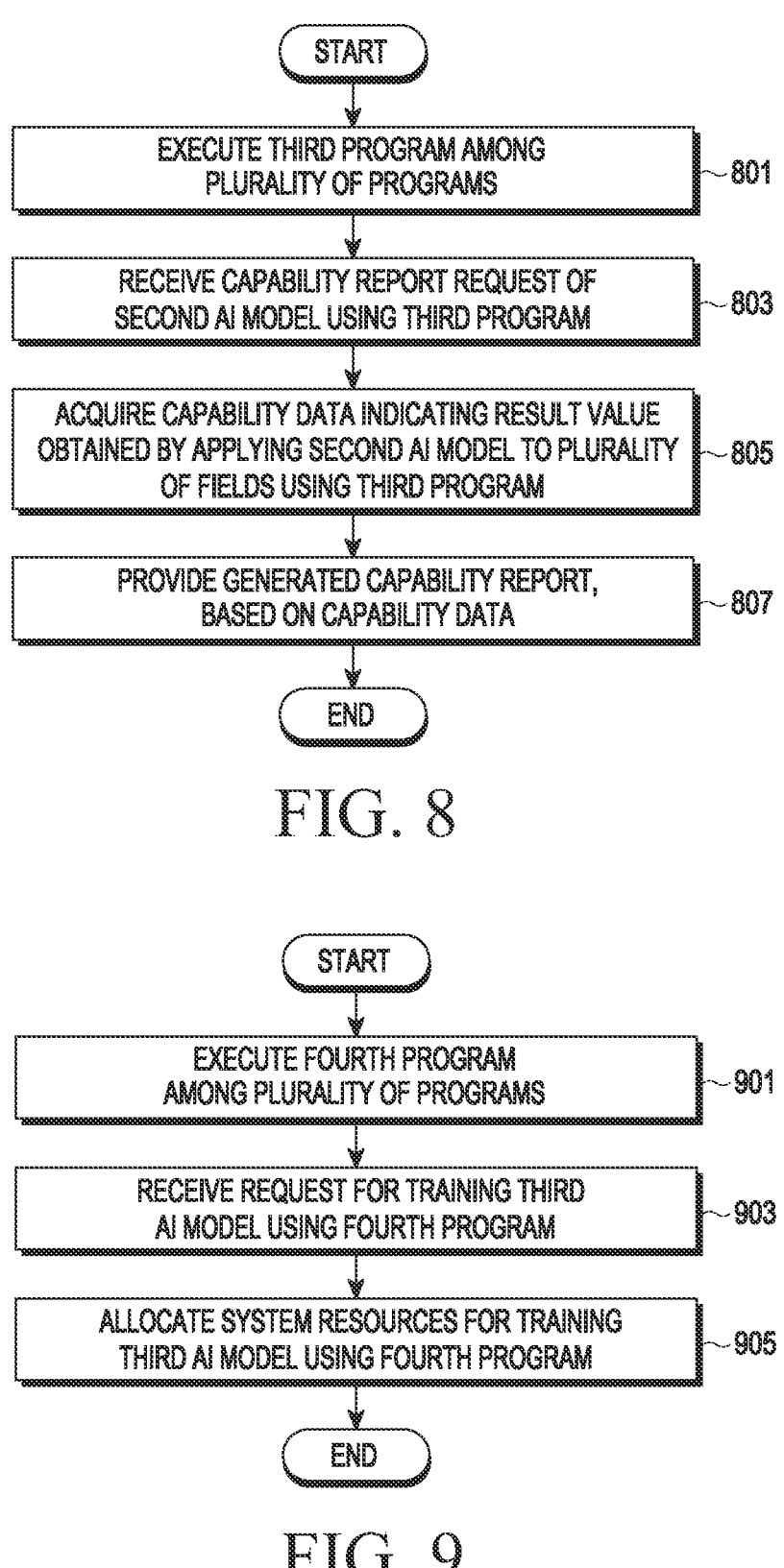

4 apparent from the following description taken in conjunction with the accompanying drawings, in which:

FIG. 1 illustrates a network environment according to various embodiments;

FIG. 2A is a diagram illustrating a blockchain network according to various embodiments;

FIG. 2B is a block diagram of an electronic device corresponding one node included in the blockchain network according to various embodiments;

FIG. 3 is a flowchart illustrating an operation of the electronic device corresponding to one node included in the blockchain network according to various embodiments;

FIG. 4 illustrates an operation in which the electronic device corresponding to one node included in the blockchain network stores data on artificial intelligence (AI) models in blocks according to various embodiments;

FIGS. 5A and 5B illustrates operations in which nodes included in the blockchain network store data on AI models in blocks according to various embodiments;

FIG. 6 is a flowchart illustrating an operation of the electronic device corresponding one node included in the blockchain network according to various embodiments;

FIG. 7 is a flowchart illustrating an operation of the electronic device corresponding one node included in the blockchain network according to various embodiments;

FIG. 8 is a flowchart illustrating an operation of the electronic device corresponding one node included in the blockchain network according to various embodiments; and FIG. 9 is a flowchart illustrating an operation of the electronic device corresponding to one node included in the blockchain network according to various embodiments.

DETAILED DESCRIPTION

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 is a block diagram illustrating an electronic device 101 in a network environment 100 according to embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2A is a diagram illustrating a blockchain network according to various embodiments.

Referring to FIG. 2A, a blockchain network 200 may include a plurality of nodes 201, 202, 203, 204, 205, and 206. For example, the blockchain network 200 may include a first node 201, a second node 202, a third node 203, a fourth node 204, a fifth node 205, and a sixth node 206. The plurality of nodes 201, 202, 203, 204, 205, and 206 may have addresses for identifying them. For example, the first node 201 may have a first address, the second node 202 may have a second address, the third node 203 may have a third address, the fourth node 204 may have a fourth address, the fifth node 205 may have a fifth address, and the sixth node 206 may have a sixth address. The plurality of nodes 201, 202, 203, 204, 205, and 206 may transmit and receive data through the blockchain network 200. For example, the plurality of nodes 201, 202, 203, 204, 205, and 206 may share a predetermined hash function and transmit and receive encrypted data through the predetermined hash function. The plurality of nodes 201, 202, 203, 204, 205, and 206 may perform data synchronization between all of the nodes 201, 202, 203, 204, 205, and 206 may even though they are connected to at least one node of the plurality of nodes 201, 202, 203, 204, 205, and 206 without a need to be necessarily connected to all of the nodes. Accordingly, all of the plurality of nodes 201, 202, 203, 204, 205, and 206 may identify the same data. Each of the plurality of nodes 201, 202, 203, 204, 205 and 206 may be referred to herein as "electronic devices" interchangeably.

According to various embodiments, the plurality of nodes 201, 202, 203, 204, 205, and 206 may identify and acquire data related to at least one artificial intelligence (AI) (hereinafter, referred to as AI model) recorded in the blockchain network 200. Further, the plurality of nodes 201, 202, 203, 204, 205, and 206 may identify and acquire robotic process automation (RPA) for managing at least one AI model recorded in the blockchain network 200.

According to various embodiments, the blockchain network 200 does not store or manage records in a centralized server, and electronic devices participating in the blockchain network 200 may gather and maintain and manage the network. Each electronic device, that is, a participant may be a node. Since the blockchain network 200 has no central manager, each of the nodes may distribute blocks according to predetermined agreement. For example, a new block of the blockchain network 200 may be generated only when more than half of the nodes participating in the blockchain network 200 agree.

According to various embodiments, each of the plurality of nodes 201, 202, 203, 204, 205, and 206 may be implemented to be the same as or similar to the electronic device 101, 102, or 104 of FIG. 1. Further, each of the plurality of nodes 201, 202, 203, 204, and 205 may be implemented to be the same as the server 108 of FIG. 1. That is, the nodes 201, 202, 203, 204, 205, and 206 may be an electronic device capable of accessing the blockchain network and transmit and receive data to and from other nodes. For example, each of the plurality of nodes 201, 202, 203, 204, 205, and 206 may be implemented as a server which manages manufacturing sites.

The number of nodes included in the blockchain network 200 of FIG. 2A is for convenience of the description, and the technical idea of the disclosure may not be limited thereto. Hereinafter, an electronic device corresponding to one node included in the blockchain network 200 is described.

FIG. 2B is a block diagram of an electronic device corresponding to one node included in the blockchain network according to various embodiments.

Referring to FIG. 2B, the electronic device 201 may include a processor 220, a memory 230, and a communication module 250. For example, the electronic device 201 may be equally or similarly applied to electronic devices corresponding to other nodes included in a blockchain network (for example, the blockchain network 200 of FIG. 2A). For example, the electronic device 201 may be a master node of the blockchain network 200.

According to various embodiments, the processor 220 may control the overall operation of the electronic device 201. For example, the processor 220 may be implemented to be the same as or similar to the processor 120 of FIG. 1.

According to various embodiments, the processor 220 may access the blockchain network (for example, the blockchain network 200 of FIG. 2A) through the communication module 250 (for example, the communication module 190 of FIG. 1). For example, the processor 220 may access the blockchain network 200 and identify and/or acquire data recorded in blocks. Further, the processor 220 may transmit and receive data to and from nodes included in the blockchain network 200 through the communication module 250. The processor 220 may store data on the blockchain network 200 in the memory 230 (for example, the memory 130 of FIG. 1).

According to various embodiments, the processor 220 may register data on the AI model in the blockchain network 200 through the communication module 250. For example, the processor 220 may generate a new block and store (or record) the data on the AI model in the new block. For example, the data on the AI model may include capability information about the AI model, information for using the AI model, and history information about registration, deletion, change, and use of the AI model. For example, when the AI model is used in a specific manufacturing site, the processor 220 may store information about the use of the AI model (for example, hours of use, a field of use, or a subject of use) and capability information.

According to various embodiments, the processor 220 may register data on a program for performing a function of managing the AI model registered in the blockchain network 200 through the communication module 250. For example, the program may be software for evaluating the capability of the AI mode or identifying whether there is an error in the capability of the AI model or performing a function of allocating system resources for training of the AI model. Further, the program may be software for performing a function of determining whether to register a new AI model in the blockchain network 200.

According to various embodiments, the processor 220 may access the blockchain network 200 in which at least one AI model is registered through the communication module 250 and identify a program for performing a function of managing the AI model registered in the blockchain network 200. The processor 220 may perform the function of managing at least one AI model registered in the blockchain network 200 through the identified program.

According to various embodiments, the processor 220 may access the blockchain network 200 and acquire data related to a first program among a plurality of programs registered in the blockchain network 200. The processor 220 may execute the first program on the basis of the data related to the first program. The processor 220 may identify the capability of the new AI model requested to be registered in the blockchain network 200 and determine whether to register the new AI model in the blockchain network 200 according to a result of the identification.

According to various embodiments, the processor 220 may access the blockchain network 200 and acquire data related to a second program among the plurality of programs registered in the blockchain network 200. The processor 220 may execute the second program based on the data related to the second program. The processor 220 may identify a capability value of a first AI model used currently used in the specific manufacturing site among at least one AI model registered in the blockchain network 200 based on the second program. The processor 220 may identify whether there is an error in the capability of the first AI model on the basis of the capability value.

According to various embodiments, the processor 220 may access the blockchain network 200 and acquire data related to a third program among the plurality of programs registered in the blockchain network 200. The processor 220 may execute the third program based on the data related to the third program. The processor 220 may receive a request for reporting the capability of the second AI model among at least one AI model registered in the blockchain network 200 from an external electronic device (For example, the electronic device 102 or 104 of FIG. 1) based on the third program. The processor 220 may acquire capability data of the second AI model indicating a result value obtained by applying the second AI model to a plurality of fields on the basis of the third program in response to the request for reporting the capability. The processor 220 may provide the generated capability report to the external electronic device based on capability data.

According to various embodiments, the processor 220 may access the blockchain network 200 and acquire data related to a fourth program among the plurality of programs registered in the blockchain network 200. The processor 220 may execute the fourth program based on the data related to the fourth program. The processor 220 may receive a request for training a third AI model among at least one AI model registered in the blockchain network 200 from an external electronic device (for example, the electronic device 102 or 104 of FIG. 1) based on the fourth program. The processor 220 may allocate system resources for training the third AI model (for example, a right to use a CPU and/or a GPU of a server for training the third AI model) to the external electronic device based on the fourth program.

According to various embodiments, the electronic device 201 may further include a display (not shown) (for example, the display module 160 of FIG. 1). For example, the processor 220 may display information about the blockchain network 200 through the display.

In the following description, generating a block may mean mining a block, and the generation of the block may need agreement in the blockchain network 200.

According to various embodiments, the processor 220 may add new data to the blockchain network 200. At this time, the processor 220 may generate a new block in the blockchain network 200. That is, the processor 220 may generate a new block to store data to be added to the blockchain network 200.

Meanwhile, at least some of the operations of the electronic device 201 described below may be performed by the processor 220.

FIG. 3 is a flowchart illustrating an operation of the electronic device corresponding to one node included in the blockchain network according to various embodiments.

According to various embodiments, in operation 301, the electronic device (for example, the electronic device 201 of FIG. 2B) may access the blockchain network (for example, the blockchain network 200 of FIG. 2A).

According to various embodiments, in operation 303, the electronic device 201 may identify a program performing a function of managing AI models stored in the blockchain network 200.

According to various embodiments, in operation 305, the electronic device 201 may perform a function of managing AI models through the identified program. For example, the function of managing AI models may include a function of detecting errors of the AI models (for example, capability errors), identifying capability of the AI models, or automatically processing registration of a new AI model. For example, the program may perform a function similar to a smart contract of Ethereum blockchain or a chaincode of Hyper-leisure fabric.

FIG. 4 illustrates an operation in which the electronic device corresponding to one node included in the blockchain network stores data on AI models in blocks according to various embodiments.

Referring to FIG. 4, according to various embodiments, a first electronic device 201 corresponding to a first node may store data on a first AI model, data on a second AI model, and data on a third AI model in a plurality of blocks 410. Accordingly, the plurality of nodes (for example, 202, 203, and 204) included in the blockchain network 200 may acquire the data on the first AI model, the data on the second AI model, and the data on the third AI model through the plurality of blocks 410.

According to various embodiments, the plurality of nodes (for example, 202, 203, and 204) included in the blockchain network 200 may store information about AI models being used in the plurality of blocks 410, respectively. For example, the second electronic device 202 corresponding to the second node may generate a new block with respect to the existing blocks and store information about the first AI model in the new block. For example, the third electronic device 203 corresponding to the third node may generate a new block with respect to the existing blocks and store data on the second AI model in the new block. For example, the fourth electronic device 204 corresponding to the fourth node may generate a new block with reference to the exiting blocks and store data on the third AI model in the new block.

According to various embodiments, the first electronic device 201 corresponding to the first node may receive a request for registering a new AI model. The first electronic device 201 may store information about the new AI model in the plurality of blocks 410 included in the blockchain network (for example, the blockchain network 200 of FIG. 2A) based on the request for registering the new AI model. For example, the first electronic device 201 may additionally generate a new block with respect to the existing blocks and store information about a new AI model in the new block.

FIGS. 5A and 5B illustrates operations in which nodes included in the blockchain network store data on AI models in blocks according to various embodiments.

Referring to FIGS. 5A and 5B, a plurality of blocks 511, 512, 513, 514, and 515 may be correlated like a chain. For example, the plurality of blocks 511, 512, 513, 514, and 515 may include a first block 511, a second block 512, a third block 513, a fourth block 514, and an Nth block 515 (for example, N is a natural number larger than or equal to 5).

According to various embodiments, the plurality of nodes 201, 202, 203, and 204 may store information about AI models and information about programs for managing AI models in the plurality of blocks 511, 512, 513, 514, and 515. For example, the plurality of nodes 201, 202, 203, and 204 may generate blocks for storing information related to AI models and/or information aboutprograms for managing AI models according to predetermined agreement. The plurality of nodes 201, 202, 203, and 204 may store the information related to the AI models and/or the information aboutprograms for managing the AI models in the new block.

According to various embodiments, a timestamp and information about the first AI model (for example, an AI model name, data and time of registration, a place to use, and capability information) may be stored in the first block 511. For example, the first block 511 may be a genesis block. A timestamp, a hash of the first block 511, and information on the second AI model (for example, an AI model name, data and time of registration, a place to use, and capability information) may be stored in the second block 512. A timestamp, a hash of the second block 512, and information about the first program may be stored in the third block 513. A timestamp, a hash of the third block 513, and information about the second program may be stored in the fourth block 514. A timestamp, a hash of an (N–1)th block, and information about the third program may be stored in the Nth block 515.

FIG. 6 is a flowchart illustrating an operation of the electronic device corresponding to one node included in the blockchain network according to various embodiments.

According to various embodiments, in operation 601, an electronic device (for example, the electronic device 201 of FIG. 2A) may execute a first program among a plurality of programs stored in a plurality of blocks included in a blockchain network (for example, the blockchain network 200 of FIG. 2A). For example, the electronic device 201 may acquire data on the first program from the blockchain network 200 and execute the first program based on the acquired data. For example, the first program may include various functions for determining capability of a new AI model.

According to various embodiments, in operation 603, the electronic device 201 may identify the capability of the new AI model requested to be registered in the blockchain network 200 based on the first program. For example, the electronic device 201 may receive a request for registering the new AI model in the blockchain network 200 from an external electronic device (for example, a developer of the new AI model). At this time, the electronic device 201 may receive capability information which is a reference for determining capability of the new AI model from the external electronic device. The electronic device 201 may compare the capability of the new AI model with the capability information received from the external electronic device based on the first program and identify whether the capability of the new AI model matches the capability information. The electronic device 201 may generate and identify first capability evaluation information about the new AI model based on the identification result. For example, the electronic device 201 may generate and identify the first capability evaluation information indicating reliability of the new AI model according to a degree of matching between the capability of the new AI model and the capability information received from the external electronic device. That is, the first capability evaluation information may include information indicating reliability of the new AI model. Further, the first capability evaluation information may include information in favor of or against registration of the new AI model.

According to various embodiments, the electronic device 201 may transmit the information about the new AI model and the capability information received from the external electronic device to each of a plurality of nodes (for example, the second node 202 to the sixth node 206 of FIG. 2A) accessing (or included in) the blockchain network 200. At this time, for each of the plurality of nodes, the electronic device 201 may make a request for identifying whether the capability of the new AI model matches the capability information and make a request for transmitting capability evaluation information indicating the identification result. Each of the plurality of nodes may identify whether the capability of the new AI model matches the capability information based on the first program and generate capability evaluation information. The electronic device 201 may acquire and identify capability evaluation information about the new AI model determined and generated by each of the plurality of nodes. For example, the capability evaluation information may include information indicating reliability of the new AI model determined by each of the plurality of nodes. Further, the first capability evaluation information may include information in favor of or against registration of the new AI model determined by each of the plurality of nodes.

According to various embodiments, in operation 605, the electronic device 201 may determine whether to register the new AI model in the blockchain network 200 according to the identification result based on the first program. For example, the electronic device 201 may determine whether to register the new AI model in the blockchain network 200 based on the first capability evaluation information and the capability evaluation information acquired from the plurality of nodes. For example, the electronic device 201 may identify whether predetermined agreement for the registration of the new AI model is satisfied based on the first capability evaluation information and the capability evaluation information acquired from the plurality of nodes. For example, when the reliability of the new AI model is higher than or equal to a threshold value, the electronic device 201 may determine to register the new AI model in the blockchain network 200. Alternatively, when more than half of the nodes agree to register the new AI model, the electronic device 201 may determine to register the new AI model in the blockchain network 200.

According to various embodiments, when it is determined to register the new AI model in the blockchain network 200, the electronic device 201 may generate a new block using the first program and store data on the new AI model. Alternatively, when it is determined to not register the new AI model in the blockchain network 200, the electronic device 201 may transmit a message indicating that the registration of the new AI model is not allowed to the external electronic device based on the first program.

Accordingly, the electronic device 201 may perform a function of determining whether to register the new AI model in the blockchain network 200 based on the first program.

FIG. 7 is a flowchart illustrating an operation of the electronic device corresponding one node included in the blockchain network according to various embodiments.

Referring to FIG. 7, according to various embodiments, in operation 701, an electronic device (for example, the electronic device 201 of FIG. 2A) may execute a second program among a plurality of programs stored in a plurality of blocks included in a blockchain network (for example, the blockchain network 200 of FIG. 2A). For example, the electronic device 201 may acquire data on the second program from the blockchain network 200 and execute the second program based on the acquired data. For example, when information indicating the result of use of the AI model in the blockchain network 200 is recorded, the second program may include various functions for determining an error in capability (or capability error) of the AI model based on information indicating the result of use.

According to various embodiments, in operation 703, the electronic device 201 may identify a capability value of a first AI model registered in the blockchain network 200 and currently used based on the second program. For example, when the first AI model is being used, data indicating the result of use of the first AI model may be recorded in the blockchain network 200. When information indicating the result of use of the first AI model is recorded in the blockchain network 200, the electronic device 201 may identify a first capability value of the first AI model based on the information indicating the result of use.

According to various embodiments, the electronic device 201 may identify the result of use of the first AI model and make a request for transmitting a capability value to each of a plurality of nodes (for example, the second node 202 to the sixth node 206 of FIG. 2A) accessing (or included in) the blockchain network 200. Each of the plurality of nodes may identify the capability value of the first AI model based on the second program. The electronic device 201 may acquire and identify the capability value of the first AI model identified by each of the plurality of nodes. For example, the capability value may include information indicating whether there is an error in the capability of the first AI model determined by each of the plurality of nodes.

According to various embodiments, in operation 705, the electronic device 201 may identify whether there is the error in the capability of the first AI model based on the first capability value and the capability value acquired from each of the plurality of nodes. For example, the electronic device 201 may identify whether predetermined agreement for determining the error in the capability of the first AI model based on the first capability value and the capability value acquired from each of the plurality of nodes. For example, when the capability value of the first AI model is equal to or lower than a threshold value, the electronic device 201 may determine that there is an error in the capability (or capability error) of the first AI model. Alternatively, when more than half of the nodes determine that there is the error in the capability of the first AI model, the electronic device 201 may determine that there is the error in the capability (or capability error) of the first AI model.

According to various embodiments, when it is determined that there is an error in the capability of the first AI model, the electronic device 201 may transmit a message informing of the error in the capability of the first AI model to a developer of the first AI model (or an electronic device of the developer) based on the second program. Further, the electronic device 201 may make a request for stopping the use of the first AI model to the plurality of nodes included in the blockchain network 200 based on the second program. In addition, the electronic device 201 may delete the first AI model from a database (for example, the memory 230 of FIG. 2B).

FIG. 8 is a flowchart illustrating an operation of the electronic device corresponding one node included in the blockchain network according to various embodiments.

Referring to FIG. 8, according to various embodiments, in operation 801, an electronic device (for example, the electronic device 201 of FIG. 2A) may execute a third program among a plurality of programs stored in a plurality of blocks included in a blockchain network (for example, the blockchain network 200 of FIG. 2A). For example, the electronic device 201 may acquire data on the third program from the blockchain network 200 and execute the third program based on the acquired data. For example, the third program may include various functions for generating and providing a capability report of a specific AI model.

According to various embodiments, in operation 803, the electronic device 201 may receive a request for reporting capability of a second AI model registered in the blockchain network 200 from an external electronic device based on the third program. For example, the capability report may include information indicating the capability result for each of a plurality of fields when the second AI model is applied to the plurality of fields.

According to various embodiments, in operation 805, the electronic device 201 may acquire capability data indicating a result value obtained by applying the second AI model to each of the plurality of fields based on the third program. For example, the data indicating the result of use (for example, a use result value) obtained by applying the second AI model to the plurality of fields may be recorded in a plurality of blocks of the blockchain network 200. The electronic device 201 may acquire capability data based on the data (for example, the use result value) indicating the result of use of the second AI model recorded in the plurality of blocks of the blockchain network 200. After the second AI model is used for each of the plurality of fields, the electronic device 201 may acquire the result value therefor or capability data from servers (for example, the plurality of nodes) managing the plurality of fields.

According to various embodiments, in operation 807, the electronic device 201 may generate a capability report on the basis of the capability data and provide the generated capability report to the external electronic device. For example, when the second AI model is used for the plurality of fields, the electronic device 201 may index capability from each of the plurality of fields to generate the capability report.

FIG. 9 is a flowchart illustrating an operation of the electronic device corresponding to one node included in the blockchain network according to various embodiments.

According to various embodiments, in operation 901, an electronic device (for example, the electronic device 201 of FIG. 2A) may execute a fourth program among a plurality of programs stored in a plurality of blocks included in a blockchain network (for example, the blockchain network 200 of FIG. 2A). For example, the electronic device 201 may acquire data on the fourth program from the blockchain network 200 and execute the fourth program based on the acquired data. For example, the fourth program may include various functions for allocating system resources required for training a specific AI model.

According to various embodiments, in operation 903, the electronic device 201 may receive a request for training a third AI model registered in the blockchain network 200 from an external electronic device based on the fourth program.

According to various embodiments, in operation 905, the electronic device 201 may allocate system resources (for example, a right to use a CPU or a GPU) of a server (for example, a training server) for training the third AI model to the external electronic device on the basis of the fourth program. For example, the electronic device 201 may transmit a token for using the system resources of the server (for example, the training server) for training the third AI model to the external electronic device.

According to various embodiments, the electronic device 201 may provide resources to the external electronic device (or a user of the external electronic device) training the third AI model based on the fourth program.

An electronic device corresponding to a node included in a blockchain network according to various embodiments may include a communication module and a processor, and the processor may be configured to access, through the communication module, the blockchain network in which at least one AI model is registered, identify one program among a plurality of programs performing functions of managing the at least one AI model registered in the blockchain network, and perform a function of managing the at least one AI model registered in the blockchain network using the one program.

The processor may be configured to execute a first program, based on data related to the first program among the plurality of programs and identify a capability of a new AI model requested to be registered in the blockchain network using the first program and determine whether to register the new AI model in the blockchain network based on a result of the identification.

The processor may be configured to receive capability information about the new AI model while receiving a request for registering the new AI model in the blockchain network, identify whether the capability of the new AI model matches the capability information, and generate first capability evaluation information about the new AI model, based on a result of the identification.

The processor may be configured to acquire capability evaluation information about the new AI model generated by each of a plurality of nodes accessing the blockchain network and determine whether to register the new AI model in the blockchain network, based on the first capability evaluation information and the capability evaluation information acquired from the plurality of nodes.

The processor may be configured to execute a second program, based on data related to the second program among the plurality of programs, identify a first capability value of the first AI model being used among the at least one AI model using the second program, and identify whether there is an error in a capability of the first AI model, based on the first capability value.

The processor may be configured to acquire a capability value of the first AI model being used, generated by each of the plurality of nodes accessing the blockchain network and identify whether there is the error in the capability of the first AI model, based on the first capability value and the capability value acquired from each of the plurality of nodes.

The processor may be configured to execute a third program, based on data related to the third program among the plurality of programs, receive a capability report request of the second AI model among the at least one AI model from an external electronic device by using the third program, acquire capability data of the second AI model indicating a result value obtained by applying the second AI model to each of a plurality of fields by using the third program in response to the capability report request, and provide a capability report generated based on the capability data to the external electronic device.

The processor may be configured to acquire the result value from blocks included in the blockchain network.

The processor may be configured to execute a fourth program, based on data relate to the fourth program among the plurality of programs, receive a request for training a third AI model among the at least one AI model from an external electronic device using the fourth program, and allocate system resources for training the third AI model, based on the request, to the external electronic device using the fourth program.

Information about the at least one AI model may be stored in a plurality of blocks included in the blockchain network.

A method of operating an electronic device corresponding to a node included in a blockchain network according to various embodiments may include an operation of accessing the blockchain network in which at least one AI model is registered, an operation of identifying one program among a plurality of programs performing functions of managing the at least one AI model registered in the blockchain network, and an operation of performing a function of managing the at least one AI model registered in the blockchain network using the one program.

The operation of performing the function of managing the at least one AI model may include an operation of executing a first program, based on data related to the first program among the plurality of programs and an operation of identifying a capability of a new AI model requested to be registered in the blockchain network using the first program and determining whether to register the new AI model in the blockchain network based on a result of the identification.

The operation of determining whether to register the new AI model in the blockchain network may include an operation of receiving capability information about the new AI model while receiving a request for registering the new AI model in the blockchain network, an operation of identifying whether the capability of the new AI model matches the capability information, and an operation of generating first capability evaluation information about the new AI model, based on a result of the identification.

The operation of determining whether to register the new AI model in the blockchain network may include an operation of acquiring capability evaluation information about the new AI model generated by each of a plurality of nodes accessing the blockchain network and an operation of determining whether to register the new AI model in the blockchain network, based on the first capability evaluation information and the capability evaluation information acquired from the plurality of nodes.

The operation of performing the function of managing the at least one AI model may include an operation of executing a second program, based on data related to the second program among the programs, an operation of identifying a first capability value of the first AI model being used among the at least one AI model using the second program, and an operation of identifying whether there is an error in a capability of the first AI model, based on the first capability value.

The operation of identifying whether there is the error in the capability of the first AI model may include an operation of acquiring a capability value of the first AI model being used, generated by each of the plurality of nodes accessing the blockchain network and an operation of identifying whether there is the error in the capability of the first AI model, based on the first capability value and the capability value acquired from each of the plurality of nodes.

The operation of performing the function of managing the at least one AI model may include an operation of executing a third program, based on data related to the third program among the programs, an operation of receiving a capability report request of a second AI model among the at least one AI model from an external electronic device using the third program, an operation of acquiring capability data of the second AI model indicating a result value obtained by applying the second AI model to a plurality of fields using the third program, and an operation of providing the capability report generated based on the capability data to the external electronic device.

The method of operating the electronic device may further include an operation of acquiring the result value from a plurality of blocks included in the blockchain network.

The operation of performing the function of managing the at least one AI model may include an operation of executing a fourth program, based on data related to the fourth program among the plurality of programs, an operation of receiving a request for training a third AI model among the at least one AI model from an external electronic device using the fourth program, and an operation of allocating system resources for training the third AI model, based on the request, to the external electronic device using the fourth program.

A non-transitory computer-readable recording medium for storing instructions, when executed by a processor, is provided. The instructions may cause the processor to access a blockchain network in which at least one AI model is registered, identify one program among a plurality of programs performing functions of managing the at least one AI model registered in the blockchain network, and perform a function of managing the at least one AI model registered in the blockchain network using the one program.

An electronic device corresponding to a node included in a blockchain network according to various embodiments may access the blockchain network in which at least one AI model is registered and manage the at least one AI model registered in the blockchain network using one program among programs performing functions of managing the at least one AI model registered in the blockchain network.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic device corresponding to a node of a blockchain network, the electronic device comprising:
    a communication module; and
    a processor configured to:
    access, through the communication module, the blockchain network in which at least one artificial intelligence (AI) model is registered;
    receive a capability report request of a first AI model among the at least one AI model from an external electronic device;
    acquire, using at least one program among a plurality of programs configured to manage the at least one AI model registered in the blockchain network, capability data of the first AI model indicating a result value obtained by applying the first AI model to each of a plurality of fields in response to the capability report request;
    provide a capability report generated based on the capability data to the external electronic device;
    execute a first program among the plurality of programs, based on data related to the first program;
    identify, using the first program, a capability of a new AI model requested to be registered in the blockchain network; and
    register the new AI model in the blockchain network based on a result of the identification of the capability of the new AI model.

2. The electronic device of claim 1, wherein the processor is further configured to:
    receive capability information about the new AI model while receiving a request for registering the new AI model in the blockchain network;
    identify whether the capability of the new AI model matches the capability information; and
    generate first capability evaluation information about the new AI model based on a result of the identification as to whether the capability of the new AI model matches the capability information.

3. The electronic device of claim 2, wherein the processor is further configured to:
    acquire second capability evaluation information about the new AI model generated by each of a plurality of nodes accessing the blockchain network; and
    determine whether to register the new AI model in the blockchain network, based on the first capability evaluation information and the second capability evaluation information.

4. The electronic device of claim 1, wherein the processor is further configured to:
    execute a second program among the plurality of programs based on data related to the second program;
    identify, using the second program, a first capability value of a second AI model that is being used among the at least one AI model; and
    identify whether there is an error in a capability of the second AI model, based on the first capability value.

5. The electronic device of claim 4, wherein the processor is further configured to:
    acquire a second capability value of the second AI model generated by each of a plurality of nodes accessing the blockchain network; and
    identify whether there is the error in the capability of the second AI model, based on the first capability value and the second capability value.

6. The electronic device of claim 1, wherein the processor is further configured to acquire the result value from blocks included in the blockchain network.

7. The electronic device of claim 1, wherein the processor is further configured to:
    execute a fourth program among the plurality of programs, based on data related to the fourth program;
    receive a request for training a second AI model among the at least one AI model from the external electronic device; and
    allocate, using the fourth program and based on the request for training the second AI model, system resources for training the second AI model to the external electronic device.

8. The electronic device of claim 1, wherein information about the at least one AI model is stored in a plurality of blocks included in the blockchain network.

9. A method of operating an electronic device corresponding to a node of a blockchain network, the method comprising:

accessing the blockchain network in which at least one artificial intelligence (AI) model is registered;

receiving a capability report request of a first AI model among the at least one AI model from an external electronic device;

acquiring, using at least one program among a plurality of programs configured to manage the at least one AI model registered in the blockchain network, capability data of the first AI model indicating a result value obtained by applying the first AI model to each of a plurality of fields in response to the capability report request;

providing a capability report generated based on the capability data to the external electronic device;

executing a first program among the plurality of programs, based on data related to the first program; and identifying, using the first program, a capability of a new AI model requested to be registered in the blockchain network;

registering the new AI model in the blockchain network based on a result of the identification of the capability of the new AI model.

10. The method of claim 9, wherein the registering the new AI model in the blockchain network comprises:

receiving capability information about the new AI model while receiving a request for registering the new AI model in the blockchain network;

identifying whether the capability of the new AI model matches the capability information; and generating first capability evaluation information about the new AI model, based on a result of the identification as to whether the capability of the new AI model matches the capability information.

11. The method of claim 10, wherein the registering the new AI model in the blockchain network further comprises:

acquiring second capability evaluation information about the new AI model generated by each of a plurality of nodes accessing the blockchain network; and determining whether to register the new AI model in the blockchain network, based on the first capability evaluation information and the second capability evaluation information.

12. The method of claim 9, wherein the managing the at least one AI model comprises:

executing a second program among the plurality of programs based on data related to the second program;

identifying, using the second program, a first capability value of a second AI model that is being used among the at least one AI model; and

identifying whether there is an error in a capability of the second AI model, based on the first capability value.

13. The method of claim 12, wherein the identifying whether there is the error in the capability of the second AI model comprises:

acquiring a second capability value of the second AI model generated by each of a plurality of nodes accessing the blockchain network; and identifying whether there is the error in the capability of the second AI model, based on the first capability value and the second capability value.

14. The method of claim 9, further comprising:

acquiring the result value from blocks included in the blockchain network.

15. The method of claim 9, wherein the managing the at least one AI model comprises:

executing a fourth program among the plurality of programs, based on data related to the fourth program;

receiving a request for training a second AI model among the at least one AI model from the external electronic device; and allocating, using the fourth program and based on the request for training the second AI model, system resources for training the second AI model to the external electronic device.

16. A non-transitory computer-readable recording medium storing instructions that, when executed by at least one processor, cause the at least one processor to:

access a blockchain network in which at least one artificial intelligence (AI) model is registered;

receive a capability report request of a first AI model among the at least one AI model from an external electronic device;

acquire, using at least one program among a plurality of programs configured to manage the at least one AI model registered in the blockchain network, capability data of the first AI model indicating a result value obtained by applying the first AI model to each of a plurality of fields in response to the capability report request;

provide a capability report generated based on the capability data to the external electronic device, execute a first program among the plurality of programs, based on data related to the first program;

identify, using the first program, a capability of a new AI model requested to be registered in the blockchain network; and register the new AI model in the blockchain network based on a result of the identification of the capability of the new AI model.

* * * * *